United States Patent
Huang

(10) Patent No.: US 10,373,034 B2
(45) Date of Patent: Aug. 6, 2019

(54) METHOD AND APPARATUS FOR GENERATING TWO-DIMENSIONAL BARCODE PICTURE HAVING DYNAMIC EFFECT

(71) Applicant: Tencent Technology (Shenzhen) Company Limited, Shenzhen (CN)

(72) Inventor: Jiasheng Huang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/995,873

(22) Filed: Jun. 1, 2018

(65) Prior Publication Data
US 2018/0276515 A1    Sep. 27, 2018

Related U.S. Application Data

(63) Continuation of application No. PCT/CN2017/083449, filed on May 8, 2017.

(30) Foreign Application Priority Data

May 10, 2016 (CN) .......................... 2016 1 0309494

(51) Int. Cl.
G06K 19/06 (2006.01)
G06T 13/80 (2011.01)
G06F 3/041 (2006.01)

(52) U.S. Cl.
CPC ..... *G06K 19/06037* (2013.01); *G06F 3/0416* (2013.01); *G06T 13/80* (2013.01)

(58) Field of Classification Search
CPC .......................... G06K 19/06037; G06T 13/80

(Continued)

(56) References Cited

U.S. PATENT DOCUMENTS 9,887,992 B1 * 2/2018 Venkat ................ H04L 63/0853
2015/0269466 A1   9/2015 Inotay et al.

FOREIGN PATENT DOCUMENTS

CN       103473799      12/2013
CN       103870861       6/2014

(Continued)

OTHER PUBLICATIONS

International Search Report with English translation, issued in International Application No. PCT/CN2017/083449, dated Jun. 27, 2017, pp. 1-4, State Intellectual Property Office of the P.R. China, Beijing, China.

(Continued)

*Primary Examiner* — Toan C Ly
(74) *Attorney, Agent, or Firm* — Brinks Gilson & Lione

(57) ABSTRACT

A system for generating a two-dimensional barcode picture having a dynamic effect may receive a target character string and encode the target character string into a two-dimensional barcode sequence. The system may obtain a feature bit in the two-dimensional barcode sequence and calculating relative coordinates of the feature bit in a two-dimensional barcode specification matrix. The system may obtain a preset drawing area and map the feature bit into a feature area in the drawing area according to the relative coordinates of the feature bit in the two-dimensional barcode specification matrix. The system may draw a dynamic picture in the drawing area by using a canvas component according to a preset animation effect definition. An image frame of the dynamic picture at the end of an animation effect being an image frame having the feature area configured with a pixel whose grayscale value is a standard grayscale value corresponding to the feature bit.

18 Claims, 4 Drawing Sheets

(58) Field of Classification Search
USPC .......................................................... 235/494
See application file for complete search history.

(56) References Cited

FOREIGN PATENT DOCUMENTS

| | | |
|---|---|---|
| CN | 104571887 | 4/2015 |
| CN | 106022424 | 10/2016 |
| JP | 2006-254007 A | 9/2006 |
| JP | 2008-269550 A | 11/2008 |
| JP | 2016-024716 A | 2/2016 |
| WO | WO 2015/027953 | 3/2015 |
| WO | WO 2016/107356 | 7/2016 |

OTHER PUBLICATIONS

Office Action dated May 7, 2019 for Japanese Application No. 2018-526058, 5 pages.

* cited by examiner

METHOD AND APPARATUS FOR GENERATING TWO-DIMENSIONAL BARCODE PICTURE HAVING DYNAMIC EFFECT

RELATED APPLICATION

This application is a continuation of International Application PCT/CN2017/083449, filed May 8, 2017, which claims priority to Chinese Patent Application No. 201610309494.0, filed on May 10, 2016, both of which are incorporated herein by reference in their entirety.

FIELD OF THE TECHNOLOGY

The present application relates to the field of computer technologies, and in particular, to a method and an apparatus for generating a two-dimensional barcode picture having a dynamic effect.

BACKGROUND OF THE DISCLOSURE

A two-dimensional barcode picture in the existing technology is usually a black-and-white binary picture. During recognition of a two-dimensional barcode picture, grayscale values of pixels in corresponding positions are determined to perform parsing to obtain a character string corresponding to the two-dimensional barcode picture. However, black-and-white two-dimensional barcode pictures usually have unvaried visual effect.

SUMMARY

The subject-matter of the disclosure may also relate, among others, to the following aspects. In a first aspect, a method for generating a two-dimensional barcode picture having a dynamic effect may be provided. The method may include receiving a target character string and encoding the target character string into a two-dimensional barcode sequence. The method may further include obtaining a feature bit in the two-dimensional barcode sequence. The method may further include calculating relative coordinates of the feature bit in a two-dimensional barcode specification matrix. The method may further include obtaining a preset drawing area, and mapping the feature bit into a feature area in the drawing area according to the relative coordinates of the feature bit in the two-dimensional barcode specification matrix. The method may further include drawing a dynamic picture in the drawing area by using a canvas component according to a preset animation effect definition. A dynamic effect of the dynamic picture may include a motion effect of a pixel whose grayscale value is a standard grayscale value corresponding to the feature bit in the drawing area. An image frame of the dynamic picture at the end or periodic end of the animation effect may be an image frame having the feature area filled with a pixel whose grayscale value is the standard grayscale value corresponding to the feature bit.

In a second aspect, a system for generating a two-dimensional barcode picture having a dynamic effect may be provided. The system may receive a target character string, and encode the target character string into a two-dimensional barcode sequence. The system may obtain coordinates of a feature bit. For example, the system may obtain a feature bit in the two-dimensional barcode sequence, and calculate relative coordinates of the feature bit in a two-dimensional barcode specification matrix. The system may obtain a preset drawing area, and map the feature bit into a feature area in the drawing area according to the relative coordinates of the feature bit in the two-dimensional barcode specification matrix. The system may draw a dynamic picture in the drawing area by using a canvas component according to a preset animation effect definition. A dynamic effect of the dynamic picture including a motion effect of a pixel whose grayscale value is a standard grayscale value corresponding to the feature bit in the drawing area. An image frame of the dynamic picture at the end or periodic end of the animation effect may be an image frame having the feature area filled with a pixel whose grayscale value is the standard grayscale value corresponding to the feature bit.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DESCRIPTION OF EMBODIMENTS

Figure 1:
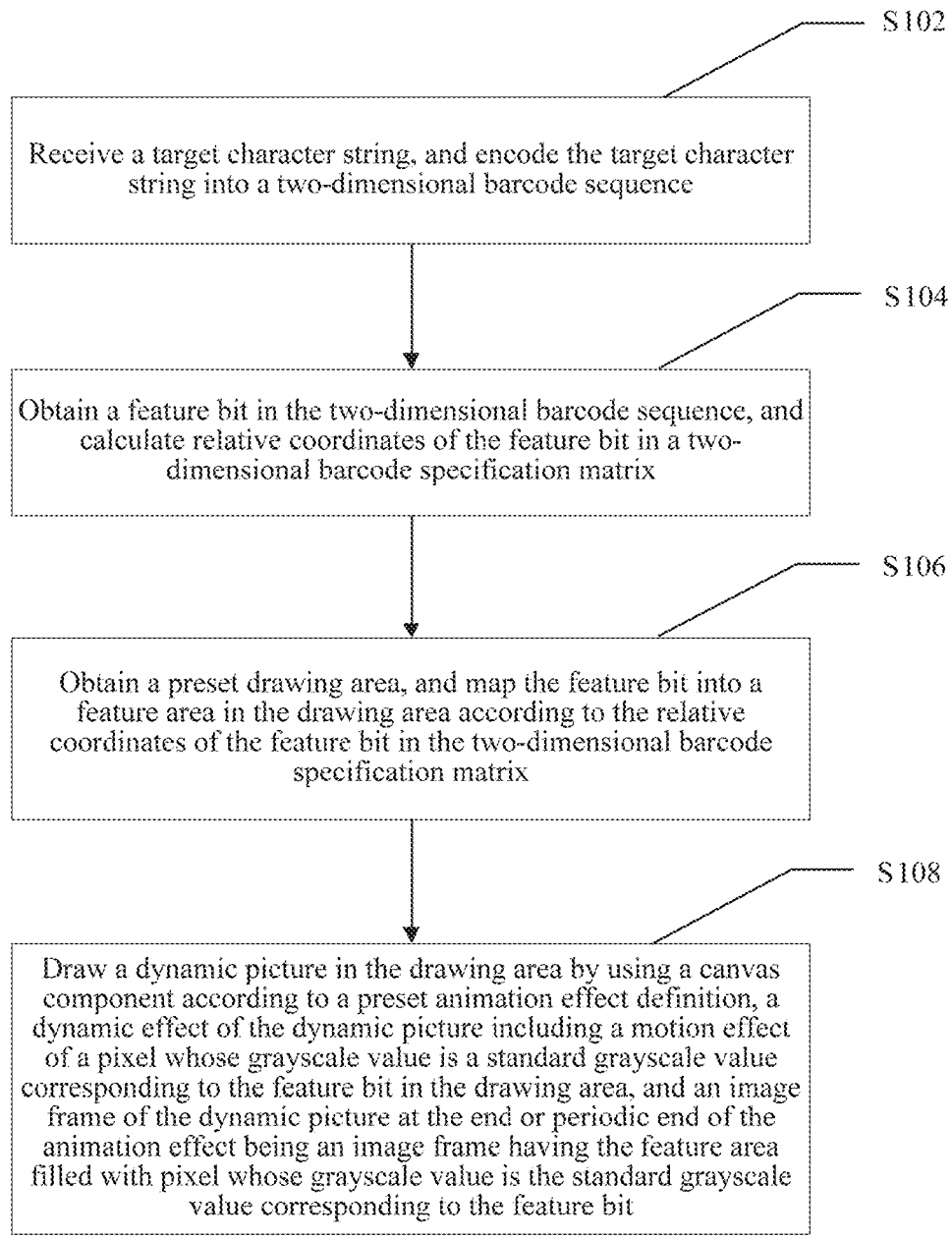
FIG. 1 is a flowchart of a method for generating a two-dimensional barcode picture having a dynamic effect according to an embodiment.

The technical solutions in the embodiments of the present application will be clearly and completely described in the following with reference to the accompanying drawings. It is obvious that the embodiments to be described are only a part rather than all of the embodiments of the present application. All other embodiments obtained by a person of ordinary skill in the art based on the embodiments of the present application without creative efforts shall fall within the protection scope of the present application.

While various embodiments are described below, it will be apparent to those of ordinary skill in the art that many more embodiments and implementations are possible. Accordingly, the embodiments described herein are examples, not the only possible embodiments and implementations.

In some conditions to bar-coding, a two-dimensional barcode picture having a dynamic effect may be manually manufactured. A user may first use image editing and processing software such as Photoshop to extract a black area part in a static black-and-white two-dimensional barcode picture (if a light-color GIF picture is chosen as a background image in a drawing area, and correspondingly, extract a white area part if the background image is a dark-color GIF picture) and then manually sets the movement of black dots to form an animation effect.

One example of a technical advancement of the system, methods, and apparatus described below may be that a two-dimensional barcode may include a dynamic picture have a dynamic effect based on a user only input of a target information set, such as a character string. The target information set may be encoded. A terminal may automatically output a two-dimensional barcode picture having a dynamic effect. In some examples, a user may specific the position and size of a drawing area and define an animation effect of pixels. The user may be relieved from using image editing software to first extract a feature part in a two-dimensional barcode picture and then manually draw a two-dimensional barcode picture frame by frame. Manufacturing efficiency and convenience of operations may be greatly improved.

In some embodiments, a method for generating a two-dimensional barcode picture having a dynamic effect is provided. In some examples, the method may be computer implemented and computer logic may be run on a computer system, such as a computer system based on a Von Neumann system. The computer logic may generate a two-dimensional barcode picture or a plug-in for generating a two-dimensional barcode picture in an application program. In some examples, the computer system may be a terminal device such as a smart phone, a tablet computer, and/or a notebook computer.

When the method is performed, a user may input a target character string, selects and sets the position and size of a drawing area, selects an animation effect (a developer may set in advance a plurality of animation effect definitions, for example, a shutter special effect, a fly-in special effect and a fly-out special effect, and a vortex special effect, and the user selects one of the animation effects), and then clicks a generation button before a terminal can automatically generate a two-dimensional barcode picture having a dynamic effect. Therefore, the efficiency of manufacturing a two-dimensional barcode picture having a dynamic effect is improved and the convenience of operations is improved.

In some examples, as shown in FIG. 1, the method for generating a two-dimensional barcode picture having a dynamic effect includes:

Step S102: Receive a target character string, and encode the target character string into a two-dimensional barcode sequence.

Step S104: Obtain a feature bit in the two-dimensional barcode sequence, and search for relative coordinates of the feature bit in a two-dimensional barcode specification matrix.

Step S106: Obtain a preset drawing area, and map the feature bit into a feature area in the drawing area according to the relative coordinates of the feature bit in the two-dimensional barcode specification matrix.

Step S108: Draw a dynamic picture in the drawing area by using a canvas component according to a preset animation effect definition. A dynamic effect of the dynamic picture, for example, including a motion effect of a pixel whose grayscale value is a standard grayscale value corresponding to the feature bit in the drawing area, and an image frame of the dynamic picture at the end or periodic end of the animation effect being an image frame having the feature area filled with a pixel whose grayscale value is the standard grayscale value corresponding to the feature bit.

A two-dimensional barcode cleverly uses in coding the concept of bit streams of "0" and "1" that form the internal logic basis of computers. Several geometric shapes corresponding to the binary system are used to represent text and numerical value information. An image input device or an optoelectronic scanning device is used to perform automatic recognition and reading to implement automatic information processing. Among various types of two-dimensional barcodes, common code systems include Data Matrix, Maxi-Code, Aztec, QR Code, Vericode, PDF417, Ultracode, Code 49, Code 16K, and the like.

The encoding of QR Code is used as an example. A process of generating a two-dimensional barcode picture of QR Code is as follows: First, each character (number, letter, symbol, or the like) in a target character string is converted into a binary sequence (for example, a sequence 0101). Binary sequences of characters are then connected. A start bit and an end bit are added to reach the length of a two-dimensional barcode sequence to obtain the two-dimensional barcode sequence. A picture is then generated according to the two-dimensional barcode sequence. A bit 1 in the sequence is black in the picture, and a bit 0 in the sequence is white in the picture. For example, a character string "ABCDE123" is encoded into a two-dimensional barcode sequence:

00100000 01000001 11001101 01000101 00101001 11011100 00101110 10000000 11101100

A feature bit in a two-dimensional barcode sequence is a bit corresponding to a same grayscale value chosen in advance in the two-dimensional barcode sequence. In the foregoing example, if a chosen color used to represent a two-dimensional barcode feature is black and a used background of a drawing area is a light-color image, all bits 1 in the sequence are feature bits. If a chosen color used to represent a two-dimensional barcode feature is white and a used background of a drawing area is a dark-color image, all bits 0 in the sequence are feature bits.

In the example that the feature bits are all bits whose value is 1, to obtain relative coordinates of a feature bit 1 in a two-dimensional barcode specification matrix is to obtain relative coordinates of all black dots in the two-dimensional barcode image corresponding to the two-dimensional barcode.

In this embodiment, the two-dimensional barcode sequence may be converted, according to a two-dimensional barcode image standard, into a two-dimensional array satisfying the two-dimensional barcode specification matrix; and a subscript of the feature bit in the two-dimensional barcode sequence in the two-dimensional array is calculated as the relative coordinates of the feature bit in the two-dimensional barcode specification matrix.

Figure 2:
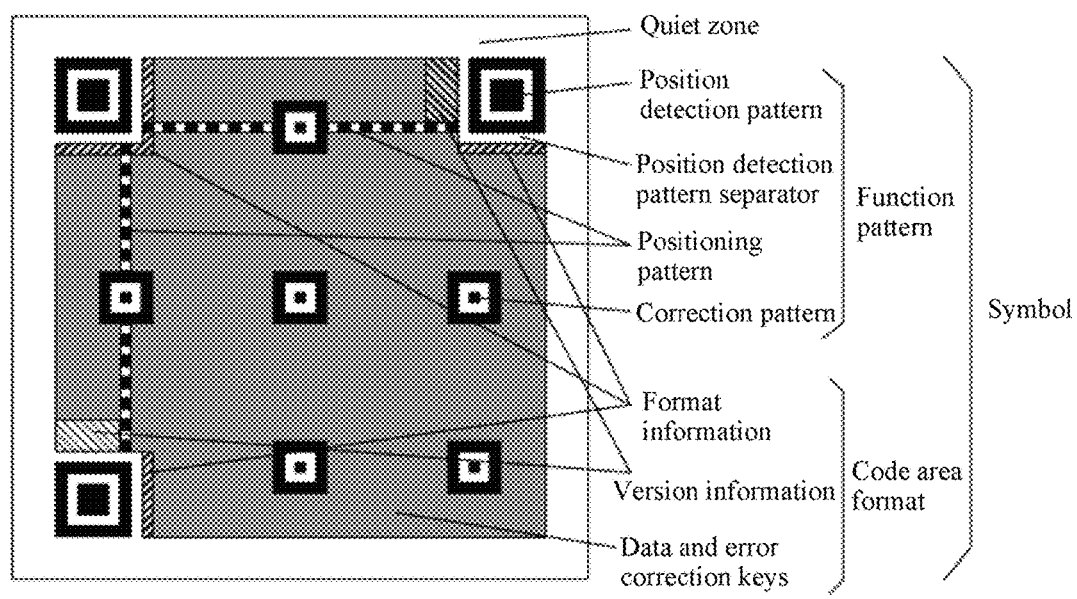
FIG. 2 is schematic diagram of content in areas of a two-dimensional barcode image matrix defined in a QR code.
Figure 3:
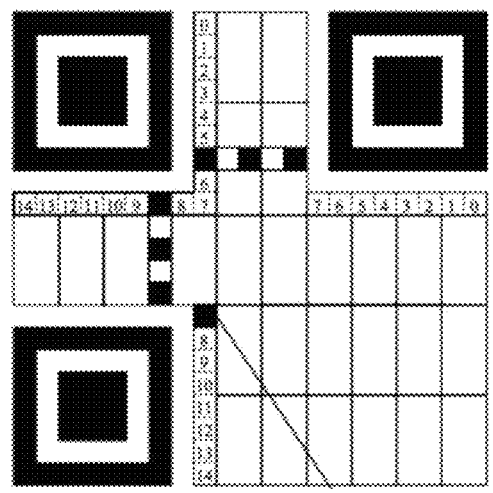
FIG. 3 is a diagram of mapping between bits in a two-dimensional barcode sequence defined in a QR code and dots in a two-dimensional barcode image matrix.

As shown in FIG. 2 and FIG. 3, FIG. 2 and FIG. 3 show an example in which a static two-dimensional barcode picture generated by using the encoding of QR code. QR code symbols have a total of 40 specifications of matrices (which are generally black and white) that range from 21×21 (Version 1) to 177×177 (Version 40). The symbols in each version have four more modules on each side than those in an earlier version. A specification matrix defined in QR code symbols is stored by using a two-dimensional array. In this example, a two-dimensional barcode sequence is first converted into a two-dimensional barcode specification matrix (for example, converted into a 21×21 matrix if Version 1 is used) according to the specifications of QR code. The value of each element in the two-dimensional barcode specification matrix is set according to the value of each bit in the two-dimensional barcode sequence. That is, a bit in the two-dimensional barcode sequence is mapped into one dot in the two-dimensional barcode specification matrix. When the feature bit is chosen to be the value 1, relative coordinates of all dots whose value is 1 in the generated two-dimensional barcode specification matrix may be obtained. The data structure of the storage of the two-dimensional barcode specification matrix in the computer system is that each dot in the two-dimensional barcode specification matrix of the two-dimensional array corresponds to each element in the two-dimensional array. When subscripts (including a horizontal-axis subscript and a vertical-axis subscript of the two-dimensional array) of an element whose value is 1 in the two-dimensional array are obtained, the relative coordinates of the feature bit in the two-dimensional barcode specification matrix are obtained.

In addition, it may further be automatically set whether the feature bit uses a bit whose value is 1 or a bit whose value is 0. Specifically, a grayscale mean value of background pixels in the drawing area may be obtained, and the feature bit may be determined according to the grayscale mean value of the background pixels in the drawing area.

For example, if the background of the drawing area has a light color after a user inputs a target character string, a terminal analyzes the light-color background image and determines that a grayscale mean value of the background image is large or is greater than a preset value. In this case, bits whose value is 1 may be selected as the feature bit to increase the contrast between the feature bit and the dynamic background image. Correspondingly, if the background of the drawing area has a dark color after the user inputs a target character string, the terminal analyzes the dark-color background image and determines that a grayscale mean value of the background image is small or is less than a preset value, a large grayscale value may be set for the feature bit to increase the contrast between the feature bit and the background of the drawing area.

In this manner, the value of a feature bit may first be automatically set according to a dynamic background image, to provide high contrast between a recognition element in a two-dimensional barcode picture and the background of the drawing area, making an eventually generated two-dimensional barcode picture more recognizable. Moreover, the user may be relieved from setting a feature bit (that is, select a bit whose value is 1 as the feature bit or a bit whose value is 0 as the feature bit), so that the convenience of operations is improved.

In step S106, a scale factor of the drawing area relative to the two-dimensional barcode specification matrix may be obtained; the relative coordinates in the two-dimensional barcode specification matrix are mapped into an area in the drawing area according to the scale factor; and a search is made for the area corresponding to the relative coordinates of the feature bit as the feature area.

For example, if a specification matrix is a 21×21 two-dimensional array:

```
1  0  ...  1
0  0  ...  0
...  ...  ...  ...
1  1  ...  1
```

Relative coordinates of feature bits may be recorded to be: (0, 0) . . . (20, 0) . . . (0, 20), (1, 20), . . . (20, 20)

The size of a dynamic background image is 105×105. A scale factor of the dynamic background image relative to a two-dimensional barcode specification matrix is 5 (5 in both the horizontal direction and the vertical direction). In this case, 5×5 pixels may be used as a unit in the dynamic background image to divide the area in which the dynamic background image is located into 21×21 areas. An area into which relative coordinates of a feature bit is mapped is a feature area. For example, the following pixel matrix presents a mapping relationship between the feature bit and the feature area:

```
1  1  1  1  1
1  1  1  1  1
1  1  1  1  1   0  ...  1
1  1  1  1  1
1  1  1  1  1
      0           0  ...  0
     ...         ...  ... ...
      1           1  ...  1
```

The foregoing recorded relative coordinates (0, 0) . . . (20, 0) . . . (0, 20), (1, 20), . . . (20, 20) of the feature bits are mapped into a special area in the dynamic background image according to formulas:

pixel coordinates of an upper-left corner vertex of the special area=the relative coordinates×the scale factor; and pixel coordinates of a lower-right corner vertex of the special area=the relative coordinates×the scale factor+4.

In this way, area coordinates of pixels that are set as special areas in the corresponding dynamic background image are obtained:

[(0, 0), (4, 4)], [(100, 0), (104, 4)], [(0, 100), (4, 104)], [(5, 100), (9, 104)], [(100, 100), (104, 104)]

In step S108, an image may be drawn frame by frame in the drawing area by using the canvas component. The positions of the pixels are changed in each frame to generate an animation special effect of a motion effect. Eventually, the feature area is filled with a pixel whose grayscale values are the standard grayscale value corresponding to the feature bit.

Figure 4:
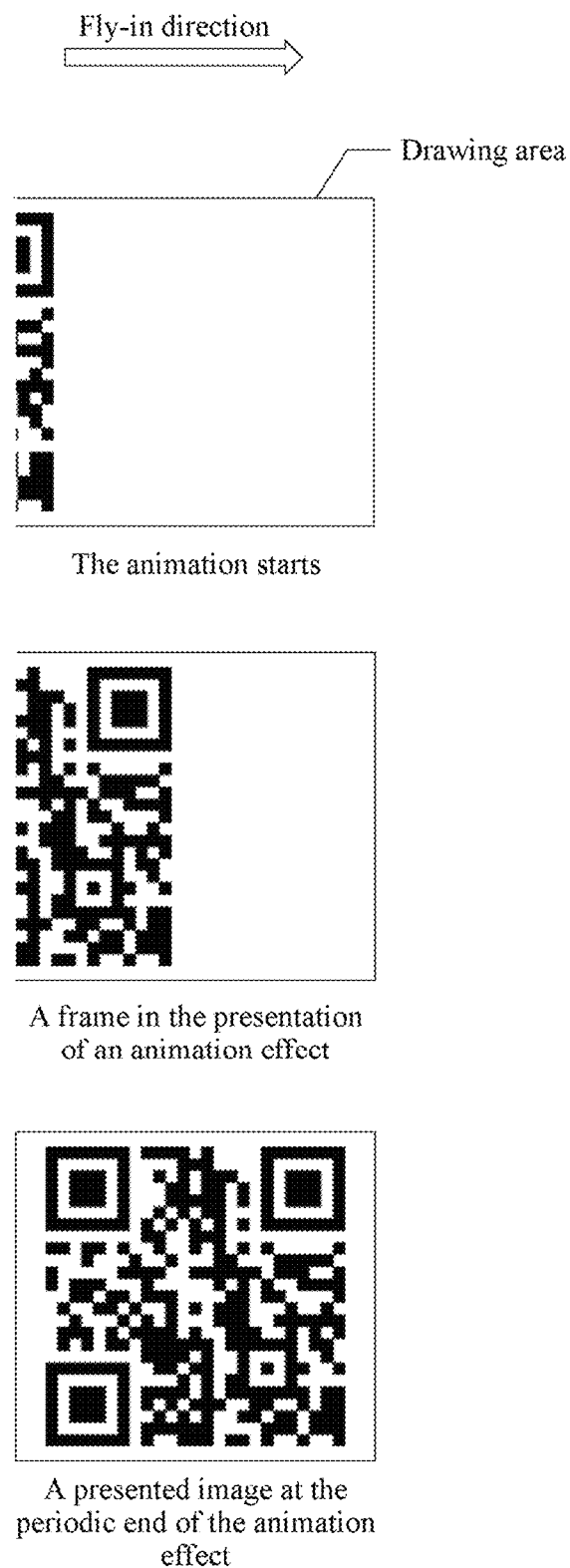
FIG. 4 is an interface diagram presenting a dynamic two-dimensional barcode picture having a fly-in or fly-out effect according to an embodiment.

As shown in FIG. 4, in an application scenario in which an animation effect definition is a fly-in or fly-out effect, an animation effect of a two-dimensional barcode picture flying in the drawing area from left to right is presented. The form of an image that may be presented when the animation effect ends or periodically ends (the animation effect is a periodically played effect, and the animation effect is played repeatedly at a next moment at the periodic end) is defined in the feature area. That is, the canvas component is used to draw, in the feature area in the image frame at the end or periodic end of the animation effect, pixel whose grayscale value is the standard grayscale value corresponding to the feature bit. During the presentation of the animation effect, the pixel whose grayscale value is the standard grayscale value corresponding to the feature bit may be selectively drawn according to the definition of the animation effect in a partial area by using the canvas component, and the positions of the pixels are changed frame by frame to enable the pixels to generate a motion effect. However, eventually, when the animation ends or periodically ends, the pixel whose grayscale value is the standard grayscale value corresponding to the feature bit may be drawn in the feature area.

A developer may provide the animation effect definitions in advance for subsequent selection by a user who manufactures a two-dimensional barcode picture having a dynamic effect. For example, the developer may define various animation effect definitions such as fly-in or fly-out, shutter, fade-in or fade-out, scale, overturn, rotate, ripple, dissolve or flicker in advance. The user may select a corresponding animation effect definition before a two-dimensional barcode picture having a corresponding animation special effect can be generated.

In this embodiment, the background of the drawing area may be a dynamic picture background in a gif format. When a canvas control is used to draw a picture on a page, the dynamic picture background is always drawn in a specified area frame by frame. Therefore, the standard grayscale value corresponding to the feature bit may be drawn in each frame of a dynamic background image according to an animation effect definition by using the canvas component. In some examples, the canvas component may be a canvas component defined in the HTML5 standard.

In this embodiment, after a two-dimensional barcode picture having a dynamic effect is generated, the two-dimensional barcode picture may be stored in the form of a gif picture and added to a web page or an application page for presentation. A user uses a camera on a mobile phone to scan the two-dimensional barcode picture when the animation effect ends or periodic ends. In this case, the presented image frame is an image frame having the feature area filled with a pixel whose grayscale value is the standard grayscale value corresponding to the feature bit. Therefore, the standard grayscale values of the feature area are all recognized to be 1 or 0. Background colors in a non-feature area are all recognized to be 0 or 1. Therefore, a corresponding character string can be recognized.

If the user intends to recognize the two-dimensional barcode picture on the terminal that presents the two-dimensional barcode picture having a dynamic effect, the user still can perform a long press on the two-dimensional barcode picture having a dynamic effect to trigger a recognition operation. The terminal then detects a long press operation on a display area in which the generated two-dimensional barcode picture having the dynamic effect is located; and generates a cover layer on top of the two-dimensional barcode picture having a dynamic effect by using the canvas component, and draws, by using the canvas component on the cover layer, the feature area filled with a pixel whose grayscale value is the standard grayscale value corresponding to the feature bit.

For example, if an event that the user makes a long press on an area in which the two-dimensional barcode picture is located is detected, a cover layer is generated in an area in which the dynamic two-dimensional barcode picture is located on a display interface, and the cover layer is on top of the dynamic two-dimensional barcode picture (for example, on a webpage, a div label may be used to define one cover layer, and it is defined that the cover layer is on top of the div label in which the dynamic two-dimensional barcode picture is located). The size of the cover layer may be set to be identical with the size of the dynamic two-dimensional barcode picture, and the content in the cover layer is drawn to be the feature area that is completely filled with a pixel whose grayscale value is the standard grayscale value corresponding to the feature bit. In this way, when a program for recognizing a two-dimensional barcode picture on the terminal obtains a picture for recognizing a two-dimensional barcode, the terminal uses the static picture having the feature area that is completely filled with a pixel whose grayscale value is the standard grayscale value corresponding to the feature bit instead of an entire dynamic two-dimensional barcode picture. Therefore, two-dimensional barcode information can be recognized by using the distribution of the standard grayscale value in the feature area in the static picture (in the foregoing scenario in which another terminal scans a two-dimensional barcode to perform recognition, because an image frame that is at the end or periodic end of a dynamic two-dimensional barcode image and is presented at a scanning moment is obtained during a scan, an operation of presenting a cover layer is may not be performed).

Furthermore, the terminal further detects a touch release operation on the display area in which the generated two-dimensional barcode picture having a dynamic effect is located, removes the cover layer, and restores presentation of the generated two-dimensional barcode picture having a dynamic effect.

That is, when a user makes a long press on a dynamic two-dimensional barcode picture, because a cover layer is located on top of the dynamic two-dimensional barcode picture, and the content in the cover layer is kept to be a static picture having the feature area that is completely filled with a pixel whose grayscale value is the standard grayscale value corresponding to the feature bit. Therefore, an image frame that is observed by the user by using the display interface and is presented in an area in which the dynamic two-dimensional barcode picture is located is kept to be the static picture having the feature area that is completely filled with a pixel whose grayscale value is the standard grayscale value corresponding to the feature bit. For the user, an effect that a dynamic two-dimensional barcode picture is paused and stops is achieved. When a finger of the user leaves a display interface and a touch release operation is triggered, because the cover layer is removed (canceled or set to be transparent), the content presented to the user is restored to the original dynamic two-dimensional barcode picture under the cover layer, for the user, an effect that the two-dimensional barcode picture restores movement from the pause and stop is achieved.

Figure 5:
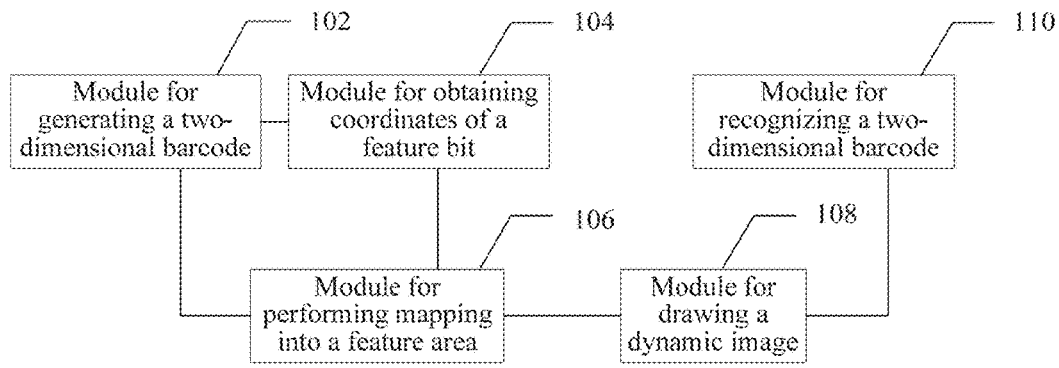
FIG. 5 is a schematic structural diagram of an apparatus for generating a two-dimensional barcode picture having a dynamic effect according to an embodiment.

Some embodiments provide an apparatus for generating a two-dimensional barcode picture having a dynamic effect. As shown in FIG. 5, the foregoing apparatus for generating a two-dimensional barcode picture having a dynamic effect includes a module 102 for generating a two-dimensional barcode, a module 104 for obtaining coordinates of a feature bit, a module 106 for performing mapping into a feature area, and a module 108 for drawing a dynamic image.

The module 102 for generating a two-dimensional barcode is configured to receive a target character string, and encode the target character string into a two-dimensional barcode sequence.

The module 104 for obtaining coordinates of a feature bit is configured to obtain a feature bit in the two-dimensional barcode sequence, and calculate relative coordinates of the feature bit in a two-dimensional barcode specification matrix.

The module 106 for performing mapping into a feature area is configured to obtain a preset drawing area, and map the feature bit into a feature area in the drawing area according to the relative coordinates of the feature bit in the two-dimensional barcode specification matrix.

The module 108 for drawing a dynamic image is configured to draw a dynamic picture in the drawing area by using a canvas component according to a preset animation effect definition.

A dynamic effect of the dynamic picture including a motion effect of a pixel whose grayscale value is a standard grayscale value corresponding to the feature bit in the drawing area.

An image frame of the dynamic picture at the end or periodic end of the animation effect being an image frame having the feature area filled with a pixel whose grayscale value is the standard grayscale value corresponding to the feature bit.

In some examples, in one of the embodiments, the module 104 for obtaining coordinates of a feature bit is further configured to convert, according to a two-dimensional barcode image standard, the two-dimensional barcode sequence into a two-dimensional array satisfying the two-dimensional barcode specification matrix; and calculate a subscript of the feature bit in the two-dimensional barcode sequence in the two-dimensional array as the relative coordinates of the feature bit in the two-dimensional barcode specification matrix.

In some examples, in one of the embodiments, the module 106 for performing mapping into a feature area is further configured to obtain a scale factor of the drawing area relative to the two-dimensional barcode specification matrix; map the relative coordinates in the two-dimensional barcode specification matrix into an area in the drawing area according to the scale factor; and search for the area corresponding to the relative coordinates of the feature bit as the feature area.

In some examples, in one of the embodiments, the module 104 for obtaining coordinates of a feature bit is further configured to obtain a grayscale mean value of background pixels in the drawing area, and determine the feature bit according to the grayscale mean value of the background pixels in the drawing area.

In some examples, in one of the embodiments, as shown in FIG. 5, the foregoing apparatus further includes a module 110 for recognizing a two-dimensional barcode, configured to detect a long press operation on a display area in which the generated two-dimensional barcode picture having the dynamic effect is located; and generating a cover layer on top of the two-dimensional barcode picture having a dynamic effect by using the canvas component, and drawing, by using the canvas component on the cover layer, the feature area filled with a pixel whose grayscale value is the standard grayscale value corresponding to the feature bit.

In some examples, in one of the embodiments, the module 110 for recognizing a two-dimensional barcode is further configured to detect a touch release operation on the display area in which the generated two-dimensional barcode picture having a dynamic effect is located, remove the cover layer, and restore presentation of the generated two-dimensional barcode picture having a dynamic effect.

After the foregoing method and apparatus for generating a two-dimensional barcode picture having a dynamic effect are used, when manufacturing a two-dimensional barcode picture having a dynamic effect, a user may first input a target character string that may be encoded, then set the position and size of a drawing area, and define an animation effect of pixels before a terminal can automatically output a two-dimensional barcode picture having a dynamic effect. The user may be relieved from using image editing software to first extract a feature part in a two-dimensional barcode picture and then manually draw a two-dimensional barcode picture frame by frame, so that the manufacturing efficiency is greatly improved and the convenience of operations is improved.

Figure 6:
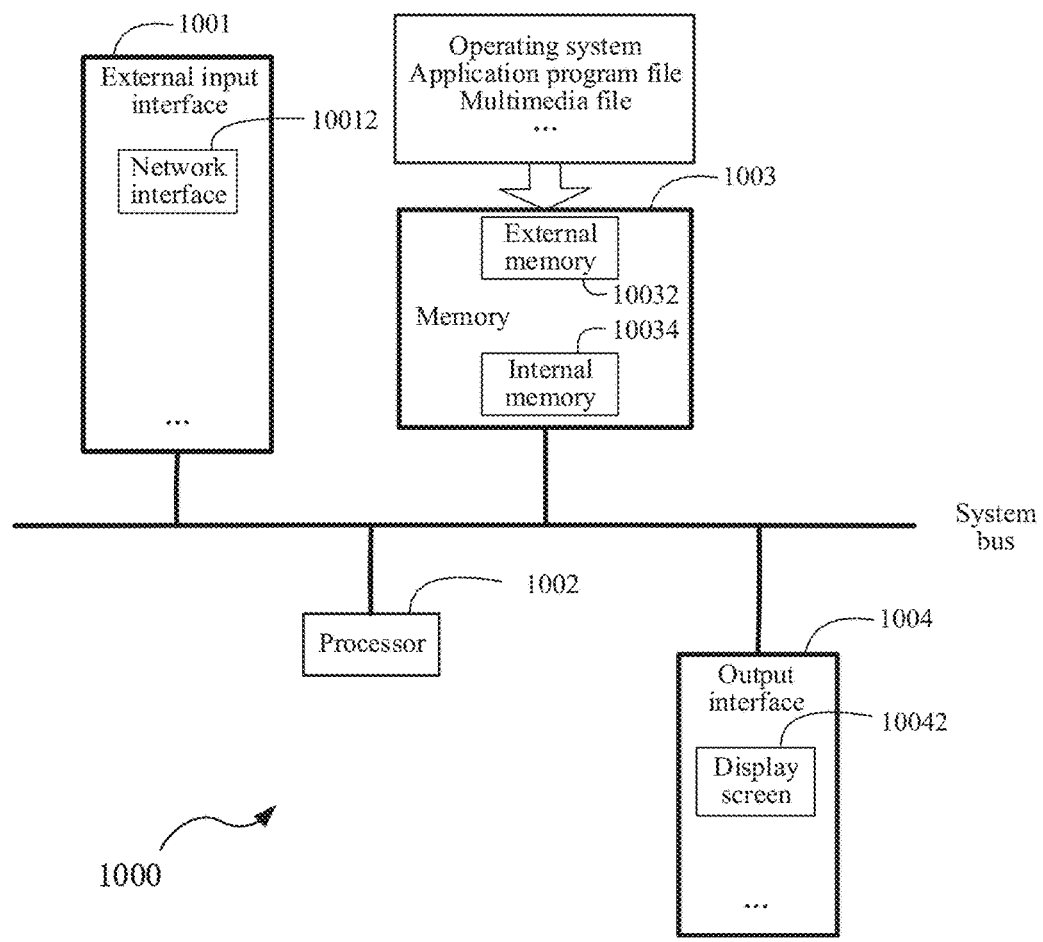
FIG. 6 is a schematic structural diagram of a computer device running the foregoing method for generating a two-dimensional barcode picture having a dynamic effect according to an embodiment.

FIG. 6 shows a system 1000 for generating a two-dimensional barcode picture having a dynamic effect. In some examples, the system 1000 may be based on a Von Neumann system, or any other suitable computing architecture. In some examples, the system 1000 may include a terminal device such as a smart phone, a tablet computer, a handheld computer, a notebook computer or a personal computer. Alternatively or in addition, the system 1000 may include an external input interface 1001, a processor 1002, a memory 1003, and an output interface 1004 that are connected through a system bus. In some examples, the external input interface 1001 may at least include a network interface 10012. The memory 1003 may include an external memory 10032 (for example, a hard disk, an optical disc or a floppy disk) and an internal memory 10034. The output interface 1004 may at least include a device such as a display screen 10042.

The methods and/or logic described herein may performed by a processor executing instructions. The instructions may be stored in a program file stored in the external memory 10032 of the system 1000. When the computer program is run, the program file may be loaded into the internal memory 10034 and then compiled into machine code, and the machine code is then transferred to the processor 1002 for execution, so as to perform the logic of the logical module 102 for generating a two-dimensional barcode, the module 104 for obtaining coordinates of a feature bit, the module 106 for performing mapping into a feature area, and/or the module 108 for drawing a dynamic image in the system 1000 based on a Von Neumann system. When the foregoing method for generating a two-dimensional barcode picture having a dynamic effect is performed, input parameters are all received by using the external input interface 1001 and transferred to the memory 1003 for caching. The input parameters are then input in the processor 1002 for processing. Result data of processing is cached in the memory 1003 for subsequent processing or is transferred to the output interface 1004 for output.

The system 1000 may be implemented many ways. In one example, the processor 1002 may also be in communication with additional elements, such as the network interface 10012. Examples of the processor 1002 may include a general processor, a central processing unit, a microcontroller, a server, an application specific integrated circuit (ASIC), a digital signal processor, a field programmable gate array (FPGA), and/or a digital circuit, analog circuit, or some combination thereof.

The processor 1002 may be one or more devices operable to execute logic. The logic may include computer executable instructions or computer code stored in the memory 1003 or in other memory that when executed by the processor 1002, cause the processor 1002 to perform the features implemented by the logic the system 1000 or methods described herein. The computer code may include instructions executable with the processor 1002.

The memory 1003 may be any device for storing and retrieving data or any combination thereof. The memory 1003 may include non-volatile and/or volatile memory, such as a random access memory (RAM), a read-only memory (ROM), an erasable programmable read-only memory (EPROM), or flash memory. Alternatively or in addition, the memory 1003 may include an optical, magnetic (hard-drive) or any other form of data storage device.

The memory 1003 may include at least one the logical module 102 for generating a two-dimensional barcode, the module 104 for obtaining coordinates of a feature bit, the module 106 for performing mapping into a feature area, and/or the module 108 for drawing a dynamic image in the system 1000. In addition, the memory may include any other component previously discussed and/or other components of the apparatus described herein.

The system 1000 may be implemented in many different ways. For example each component of the system 1000 may include a circuit or circuitry. Each circuit or circuitry may be hardware or a combination of hardware and software. The circuitry may include the logical module 102 for generating a two-dimensional barcode, the module 104 for obtaining coordinates of a feature bit, the module 106 for performing mapping into a feature area, the module 108 for drawing a dynamic image in the system 1000, and/or other components and subcomponents of the described herein. Accordingly, the term module may be used interchangeably with the term module circuitry or circuitry. In some examples, each circuit or circuitry may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each circuitry may include memory hardware, such as a portion of the memory 1003, for example, that comprises instructions executable with the processor 1002 or other processor to implement one or more of the features of the circuitry. When any one of the circuitry includes the portion of the memory that comprises instructions executable with the processor 1002, the circuitry may or may not include the processor 1002. In some examples, each circuitry may just be the portion of the memory 1003 or other physical memory that comprises instructions executable with the processor 1002 or other processor to implement the features of the corresponding circuitry without the circuitry including any other hardware. Because each circuitry includes at least some hardware even when the included hardware comprises software, each circuitry may be interchangeably referred to as a hardware circuitry.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method for generating a two-dimensional barcode picture having a dynamic effect, the method comprising:
   receiving a target information set;
   encoding the target information set into a two-dimensional barcode sequence;
   obtaining a feature bit included in the two-dimensional barcode sequence;
   calculating relative coordinates of the feature bit in a two-dimensional barcode specification matrix;
   mapping the feature bit into a feature area in a preset drawing area according to the relative coordinates of the feature bit in the two-dimensional barcode specification matrix; and
   drawing a dynamic picture having an animation effect in the preset drawing area by using a canvas component according to a preset animation effect definition, the animation effect of the dynamic picture comprising a motion effect that dynamically changes a greyscale value of a first pixel in the feature area based on the preset animation effect definition and a predetermined grayscale value corresponding to the feature bit that is mapped to the feature area, wherein a target image frame of the dynamic picture at an end or a periodic end of the animation effect includes the feature area filled with a second pixel, the second pixel set to the predetermined grayscale value corresponding to the feature bit.

2. The method of claim 1, wherein the calculating relative coordinates of the feature bit in the two-dimensional barcode specification matrix comprises:
   converting, according to a two-dimensional barcode image standard, the two-dimensional barcode sequence into a two-dimensional array based on the two-dimensional barcode specification matrix; and
   calculating a subscript of the feature bit in the two-dimensional barcode sequence in the two-dimensional array as the relative coordinates of the feature bit in the two-dimensional barcode specification matrix.

3. The method of claim 1, wherein the mapping the feature bit into the feature area in the preset drawing area according to the relative coordinates of the feature bit in the two-dimensional barcode specification matrix comprises:
   obtaining a scale factor of the preset drawing area relative to the two-dimensional barcode specification matrix;
   mapping the relative coordinates in the two-dimensional barcode specification matrix into an area in the preset drawing area according to the scale factor; and
   searching for the area corresponding to the relative coordinates of the feature bit as the feature area.

4. The method of claim 1, further comprising:
   obtaining a grayscale mean value of background pixels in the preset drawing area; and
   determining the feature bit according to the grayscale mean value of the background pixels in the preset drawing area.

5. The method of claim 1, further comprising:
   detecting a long press operation on a display area in which the dynamic picture is located; and
   generating a cover layer on top of the dynamic picture by using the canvas component, and drawing, by using the canvas component on the cover layer, the feature area configured with the second pixel whose grayscale value is the predetermined grayscale value corresponding to the feature bit.

6. The method of claim 5, further comprising:
   detecting a touch release operation on the display area; and
   removing the cover layer to restore animation of the dynamic picture.

7. An apparatus for generating a two-dimensional barcode picture having a dynamic effect, comprising: a processor, the processor configured to:
   encode a target information set into a two-dimensional barcode sequence;
   obtain a feature bit included in the two-dimensional barcode sequence;
   calculate relative coordinates of the feature bit in a two-dimensional barcode specification matrix;
   map the feature bit to a feature area included in a preset drawing area according to the relative coordinates of the feature bit in the two-dimensional barcode specification matrix; and
   display a dynamic animation of a dynamic picture in the preset drawing area by using a canvas component according to a preset animation effect definition, the dynamic animation of the dynamic picture comprising a motion effect that causes the processor to:
      cause a first pixel to have a predetermined grayscale value corresponding to the feature bit mapped to the feature area, and
      in response to an end or a periodic end of the animation effect, cause a second pixel to have a predetermined grayscale value corresponding to the feature bit.

8. The apparatus of claim 7, wherein the processor is further configured to:
   convert, according to a two-dimensional barcode image standard, the two-dimensional barcode sequence into a two-dimensional array satisfying the two-dimensional barcode specification matrix; and
   calculate a subscript of the feature bit in the two-dimensional barcode sequence in the two-dimensional array as the relative coordinates of the feature bit based on the two-dimensional barcode specification matrix.

9. The apparatus of claim 7, wherein the processor is further configured to:
   obtain a scale factor of the preset drawing area relative to the two-dimensional barcode specification matrix;
   map the relative coordinates in the two-dimensional barcode specification matrix into an area in the preset drawing area according to the scale factor;
   search for the area corresponding to the relative coordinates of the feature bit; and
   set the feature area to the area.

10. The apparatus of claim 7, wherein the processor is further configured to:
    obtain a grayscale mean value of background pixels in the preset drawing area; and
    determine the feature bit according to the grayscale mean value of the background pixels in the preset drawing area.

11. The apparatus of claim 7, wherein the processor is further configured to:
- detect a long press operation on a display area in which the dynamic picture is animated and
- generate a cover layer on top of the dynamic picture by using the canvas component; and
- draw, by using the canvas component on the cover layer, an image frame comprising the feature area configured with the second pixel and cause the second pixel to have the predetermined grayscale value corresponding to the feature bit mapped to the feature area.

12. The apparatus of claim 11, wherein the processor is further configured to:
- detect a touch release operation on the display area in which the cover layer is located, remove the cover layer, and restore presentation of the dynamic picture.

13. A non-transitory computer readable storage medium, storing computer readable instructions, the computer readable instructions causing one or more processors to:
- encode a target information set into a two-dimensional barcode sequence;
- obtain a feature bit included in the two-dimensional barcode sequence;
- calculate relative coordinates of the feature bit in the two-dimensional barcode specification matrix;
- map the feature bit into a feature area in a drawing area according to the relative coordinates of the feature bit in the two-dimensional barcode specification matrix; and
- draw a dynamic picture having an animation effect in the drawing area by using a canvas component according to a preset animation effect definition, the animation effect of the dynamic picture comprising a motion effect that dynamically changes a greyscale value of a first pixel in the feature area based on the preset animation effect definition and a predetermined grayscale value corresponding to the feature bit that is mapped to the feature area, wherein a target image frame of the dynamic picture at an end or a periodic end of the animation effect includes the feature area configured with a second pixel set to the predetermined grayscale value corresponding to the feature bit.

14. The storage medium of claim 13, wherein the computer readable instructions further cause the one or more processors to:
- convert, according to a two-dimensional barcode image standard, the two-dimensional barcode sequence into a two-dimensional array based on the two-dimensional barcode specification matrix; and
- calculate a subscript of the feature bit in the two-dimensional barcode sequence in the two-dimensional array as the relative coordinates of the feature bit in the two-dimensional barcode specification matrix.

15. The storage medium of claim 13, wherein the computer readable instructions cause the one or more processors to:
- obtain a scale factor of the drawing area relative to the two-dimensional barcode specification matrix;
- map the relative coordinates in the two-dimensional barcode specification matrix into an area in the drawing area according to the scale factor; and
- search for the area corresponding to the relative coordinates of the feature bit as the feature area.

16. The storage medium of claim 13, wherein the computer readable instructions cause the one or more processors to:
- obtain a grayscale mean value of background pixels in the drawing area; and
- determine the feature bit according to the grayscale mean value of the background pixels in the drawing area.

17. The storage medium of claim 13, wherein the computer readable instructions cause the one or more processors to:
- detect a long press operation on a display area in which the dynamic picture is located; and
- generate a cover layer on top of the dynamic picture by using the canvas component, and drawing, by using the canvas component on the cover layer, the feature area configured with the second pixel whose grayscale value is the predetermined grayscale value corresponding to the feature bit.

18. The storage medium of claim 17, wherein the computer readable instructions cause the one or more processors to:
- detecting a touch release operation on the display area; and
- removing the cover layer to restore animation of the dynamic picture.

* * * * *